T. BOTNEN.
TOOL FOR REMOVING BOILER TUBE SECTIONS.
APPLICATION FILED FEB. 28, 1916.
1,199,047.
Patented Sept. 26, 1916.
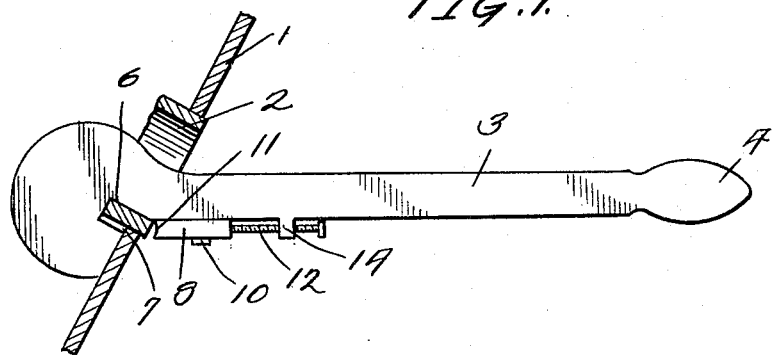
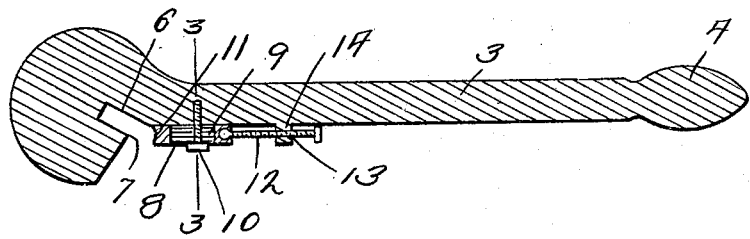
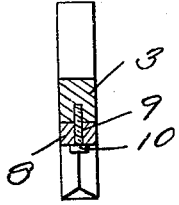
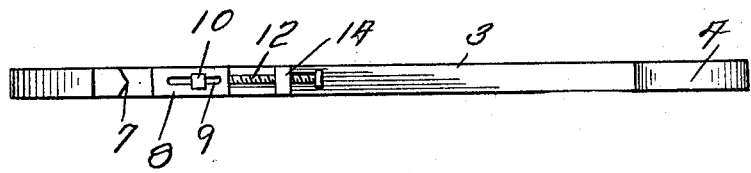
Inventor
T. Botnen

UNITED STATES PATENT OFFICE.

THEODORE BOTNEN, OF WAHPETON, NORTH DAKOTA.

TOOL FOR REMOVING BOILER-TUBE SECTIONS.

1,199,047. Specification of Letters Patent. Patented Sept. 26, 1916.

Application filed February 28, 1916. Serial No. 81,002.

*To all whom it may concern:*

Be it known that I, THEODORE BOTNEN, a citizen of the United States, residing at Wahpeton, in the county of Richland, State of North Dakota, have invented certain new and useful Improvements in Tools for Removing Boiler-Tube Sections; and I do hereby declare the following to be a full, clear, and exact description of the invention, such as will enable others skilled in the art to which it appertains to make and use the same.

The present invention is directed to improvements in tools for removing boiler tube sections remaining in the tube sheets after the tubes have been cut.

The invention has for its object to construct a tool of this type which can be manipulated for prying the ring-like sections of tubing from the tube sheet after the major part of the tubes have been cut.

A further object of the invention is to provide a tool of this nature provided with a pair of jaws, one of which is adjustable to permit the use of the tool for removing sections of various sizes.

With these and other objects in view, this invention resides in the novel features of construction, formation, combination and arrangement of parts to be hereinafter more fully described, claimed and illustrated in the accompanying drawing, in which:—

Figure 1 is a vertical sectional view through the tube sheet, showing the tool in side elevation. Fig. 2 is a longitudinal sectional view through the tool. Fig. 3 is a sectional view on line 3—3 of Fig. 1. Fig. 4 is an edge view of the tool.

Referring to the drawing 1 indicates the tube sheet and 2 a section of tube, which is engaged therein after the major part of the tube has been cut, and is to be removed before the new tubes can be substituted.

The tool for removing the sections comprises a handle 3, the outer end of which is provided with a hand grip 4, while the inner end thereof is provided with a head, which is substantially circular in shape and of a diameter less than that of the tube section to be removed. The head is provided with an open ended slot 6 which is located adjacent the inner end of the handle and is disposed in angular relation thereto. By providing the slot 6, a hooked rigid jaw 7 is provided, the purpose of which will appear later.

The movable jaw 8 is provided with a longitudinal slot 9 which is engaged by the bolt 10 said bolt being engaged with the handle 3 at a point adjacent the open end of the slot 6, and with which the inner end of the jaw is alined. The inner end of the jaw 8 is provided with a curved seat 11 which is adapted to engage the outer edge of the tube section 2 and constitutes a fulcrum for the tool, whereby the same can be easily rocked to facilitate the removal of the tube section by a prying action.

Swivelly connected to the rear end of the jaw 8 is the forward end of a screw 12, said screw being in threaded engagement with the bore 13 formed in the block 14, said block being connected integrally to the handle 3. The other end of the screw 12 is provided with an actuating knob 15, whereby the screw can be conveniently rotated to slide the jaw 8 toward or away from the jaw 7, as the occasion may require.

After the tube has been cut and it is desired to remove the ring-like section of tube remaining in the opening of the tube sheet, the head 5 is inserted in the section and the slot 6 engaged with the inner periphery thereof, so that the jaw 7 will engage the section, whereupon the jaw 8 is adjusted until the seat 11 thereof engages the outer edge of the tube section. Upon properly adjusting the jaws in respect to the section, the handle is swung downwardly, thus causing the jaw 7 to crimp the tube section. After the tube section has been crimped at one point, the tool is moved to another point until the same can be easily forced from the sheet opening.

What is claimed is:—

A tool for removing boiler tube sections comprising a handle, a head formed on the inner end thereof and having a slot formed therein to provide a fixed jaw for engaging the inner edge of the tube section when the same is engaged in the slot, a movable jaw slidably connected to the handle and alined with said slot, the inner end of the movable jaw having a curved seat for engaging the outer edge of the tube section to hold the same engaged with the fixed jaw, a block carried by the handle, and a screw engaged in the block and having its forward end swivelly connected to the rear end of the movable jaw, said screw being operable to adjust the movable jaw toward or away from the fixed jaw.

In testimony whereof, I affix my signature, in the presence of two witnesses.

THEODORE BOTNEN.

Witnesses:
C. T. PAULSON,
JNO. WICKLINS.

Copies of this patent may be obtained for five cents each, by addressing the "Commissioner of Patents, Washington, D. C."